United States Patent [19]

Flinner

[11] Patent Number: 5,588,249

[45] Date of Patent: Dec. 31, 1996

[54] HUMANE RODENT TRAP

[76] Inventor: John Flinner, 104 Sundance Pass, Lafayette, La. 70508

[21] Appl. No.: 438,392

[22] Filed: May 10, 1995

[51] Int. Cl.$^6$ ................................................ A01M 23/20
[52] U.S. Cl. ........................................................ 43/61; 43/67
[58] Field of Search ................................. 43/58, 60, 61, 43/62, 67

[56] References Cited

U.S. PATENT DOCUMENTS

| | | | |
|---|---|---|---|
| 2,247,931 | 7/1941 | Vincent | 43/67 |
| 2,478,605 | 2/1946 | Symens | 43/61 |
| 2,599,711 | 6/1952 | Hembree | 43/67 |
| 3,075,316 | 1/1963 | Pimentel | 43/67 |
| 3,113,395 | 6/1961 | Van Kuren | 43/61 |
| 3,762,093 | 10/1973 | Rohde | 43/61 |
| 3,778,922 | 12/1973 | Clark | 43/61 |
| 4,159,590 | 7/1979 | Palfalvy | 43/61 |
| 4,270,299 | 6/1981 | Long | 43/58 |
| 4,310,984 | 1/1982 | Brubaker, Jr. | 43/61 |
| 4,342,172 | 8/1982 | Guanci | 43/61 |
| 4,590,704 | 5/1986 | Volk | 43/61 |
| 4,682,441 | 7/1987 | Straven | 43/61 |

*Primary Examiner*—Kurt Rowan
*Attorney, Agent, or Firm*—Joseph L. Lemoine, Jr.

[57] ABSTRACT

A rodent trap including a bottom, two opposing side walls, a front wall with inlet opening, a rear wall with access door, a horizontal partition defining upper and lower compartments, and an openable top. The rear access door allows rodent bait to be placed in the lower compartment. The front wall inlet opening allows rodent entry to the lower compartment. In the lower compartment is disposed a pivotal trigger mechanism which is connected by linkage to a trip mechanism of a mechanical intensifier disposed in the upper compartment, and a kinetic member of the mechanical intensifier is in turn connected by linkage to a release means for a door vertically slidable from a position above the inlet opening to a position closing the inlet opening. A conventional spring-striker mouse trap may be used for said mechanical intensifier, trip mechanism and kinetic member. When a rodent steps on the trigger mechanism, a trigger linkage pulls the conventional mousetrap trip mechanism, releasing the striker wire of the conventional mousetrap to operate. Release of the striker wire, through a upper linkage, pulls a pin holding the door above the inlet opening, releasing said door to move downward under the influence of tensioning means and close the inlet opening. Closure of the trap door as aforesaid traps the rodent in the lower compartment. Release of the rodent is accomplished without accessing the lower compartment by opening the top of the trap and retracting the trap door from the upper compartment.

15 Claims, 4 Drawing Sheets

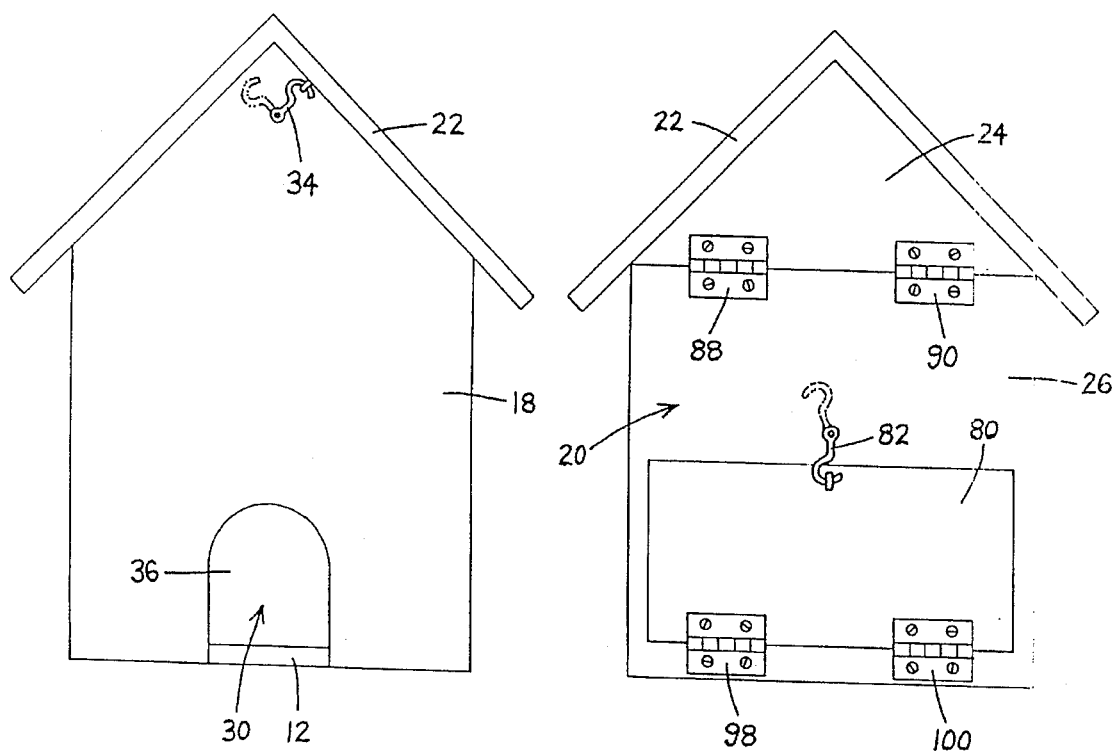
FIG. 2.
FIG. 3.
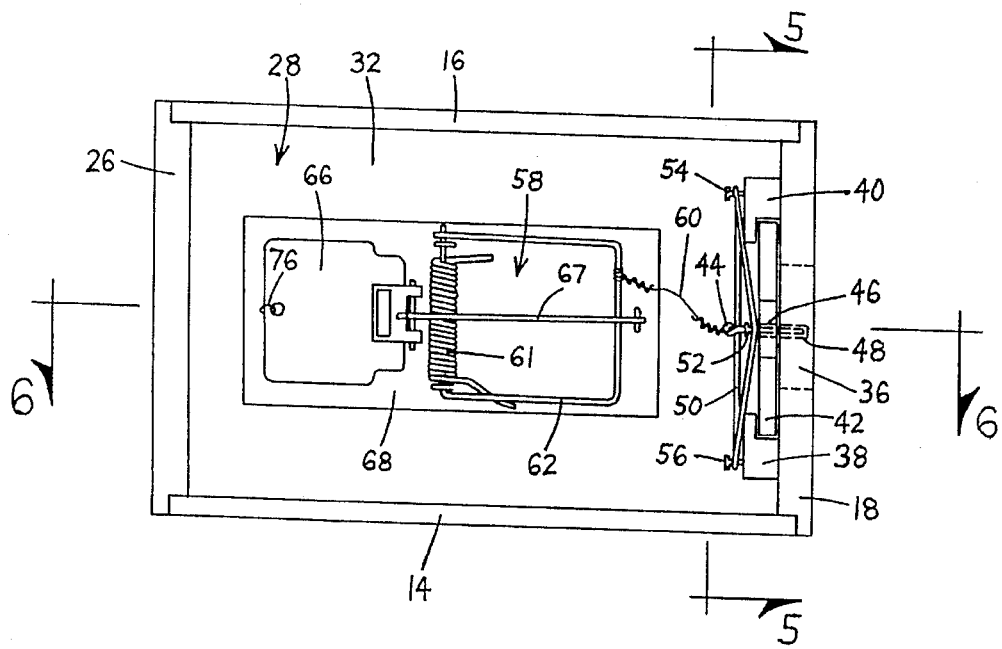
FIG. 4.

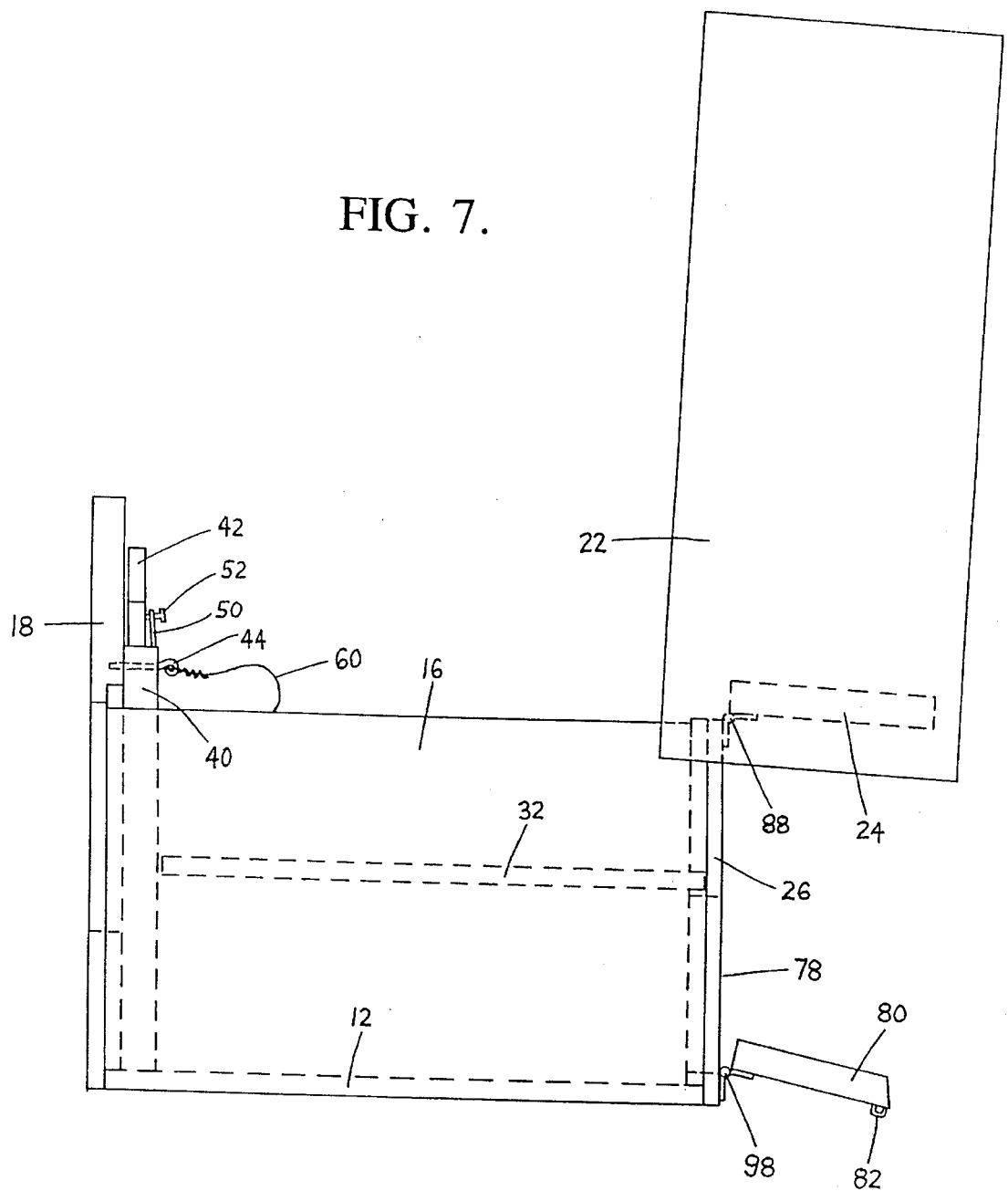

HUMANE RODENT TRAP

FIELD OF INVENTION

This invention relates to rodent traps, specifically to a trap which captures a rodent alive and unharmed, and then allows for safe release of the rodent.

DESCRIPTION OF PRIOR ART

Numerous traps which are designed to capture rodents alive and unharmed are well known. Many of these traps generally provide a closable cage-like structure having a closable inlet opening, and a trigger mechanism which causes the rodent to become trapped within the cage-like structure, but those traps possess one or more of the following disadvantages:

(a) An inlet opening of unnecessarily large dimension which allows pets or children to reach into the cage-like structure and touch the trigger mechanism, resulting in accidental triggering of the trap.

(b) A trigger mechanism linkage which is located partially or completely outside of the cage-like structure, whereby the linkage is externally exposed and can be touched by pets or children, resulting in accidental triggering of the trap.

(c) A trigger mechanism or trigger linkage located inside the cage-like structure, but also located near the inlet opening. Having a trigger mechanism or trigger linkage near the inlet opening is undesirable because it allows pets or children to easily reach and touch the trigger mechanism or trigger linkage to accidentally trigger the trap.

(d) A door, whose function is to close the inlet opening when the trap is triggered, is located partially or completely outside of the cage-like structure when the door is in the open position, thereby allowing pets or children to touch the exposed door to accidentally trigger the trap.

(e) A complex trigger linkage comprising multiple moving parts. Complex linkages have a tendency to jam or slow down the trapping process.

(f) A trap design which allows the rodent to reach the bait without triggering the trap.

(g) A trap design which relies solely upon a rodent's weight, or a rodent's push or pull to release a closable door. The force created by a rodent's bodyweight, or a rodent's push or pull, is a relatively weak force. The absence of a mechanical intensifier to intensify the weak force can result in insufficient force to release a closable door.

(h) A trap design with inconvenient access to internal parts, thus making it difficult for the user to reach and manipulate various parts when baiting and setting the trap.

(i) Complexity of trap design resulting in the trap being difficult or expensive to manufacture, and difficult to operate.

OBJECTS AND ADVANTAGES

Accordingly, several objects and advantages of my invention are:

(a) To provide a rodent trap which has a small rodent-size inlet opening, making it difficult for larger animals to reach into the trap.

(b) To provide a rodent trap in which the trigger mechanism linkage is enclosed within a closable housing, thus preventing accidental triggering when the outside of the trap is touched.

(c) To provide a rodent trap whose trigger mechanism and trigger linkage are located far enough from the inlet opening such that children or pets cannot easily touch the trigger mechanism or trigger linkage should they extend a finger or paw through the inlet opening.

(d) To provide a rodent trap whose sliding trap door is enclosed within the trap housing, thereby preventing the door from being easily touched and accidentally triggered to the closed position.

(e) To provide a rodent trap with trigger linkage of simple design, whereby moving parts will not jam or slow down the trapping process.

(f) To provide a rodent trap with trigger mechanism located between the inlet opening and the bait, thus making it difficult for a rodent to reach the bait without triggering the trap.

(g) To provide a rodent trap that incorporates a mechanical intensifier to ensure the release of a closable door. The input to the mechanical intensifier is the weak downward force of a rodent's bodyweight. The mechanical intensifier's output is a force of greater magnitude, which is used to release a closable door.

(h) To provide a rodent trap which gives the user easy access to internal parts, thereby making the trap easy to set and bait.

(i) To provide a rodent trap of simple design which is inexpensive, easy to build, and easy to operate.

Further objects and advantages of my invention will become apparent from a consideration of the drawings and ensuing description.

DRAWING FIGURES

FIG. 2 is a side plan view of the front end of the rodent trap.

FIG. 3 is a side plan view of the rear end of the rodent trap.

FIG. 4 is a top plan view of the rodent trap with the top broken away to illustrate parts located within the upper compartment.

FIG. 5B illustrates the trap door in its lower or closed position.

FIG. 7 is a side plan view of the side of the rodent trap, illustrating the open positions of the access door and the top.

Reference Numerals In Drawings

| | |
|---|---|
| 10 rodent trap | 12 bottom |
| 14 side wall | 16 side wall |
| 18 front wall | 20 rear wall |
| 22 top | 24 rear wall upper section |
| 26 rear wall lower section | 28 upper compartment |
| 30 lower compartment | 32 partition |
| 34 latch | 36 inlet opening |
| 38 side channel | 40 side channel |
| 42 trap door | 44 pin |
| 46 hole | 48 recess |
| 50 rubber band | 52 nail |
| 54 nail | 56 nail |
| 58 mechanical intensifier | 60 upper linkage |
| 61 stored energy device | 62 kinetic member |
| 63 arrow | 64 hole |
| 66 trip mechanism | 67 release member |
| 68 base | 70 trigger mechanism |
| 72 tack | 74 tack |
| 76 trigger linkage | 78 access opening |
| 80 access door | 82 latch |
| 84 bait | 88 hinge |
| 90 hinge | 98 hinge |
| 100 hinge | |

DESCRIPTION OF THE PREFERRED EMBODIMENT

Figure 1:
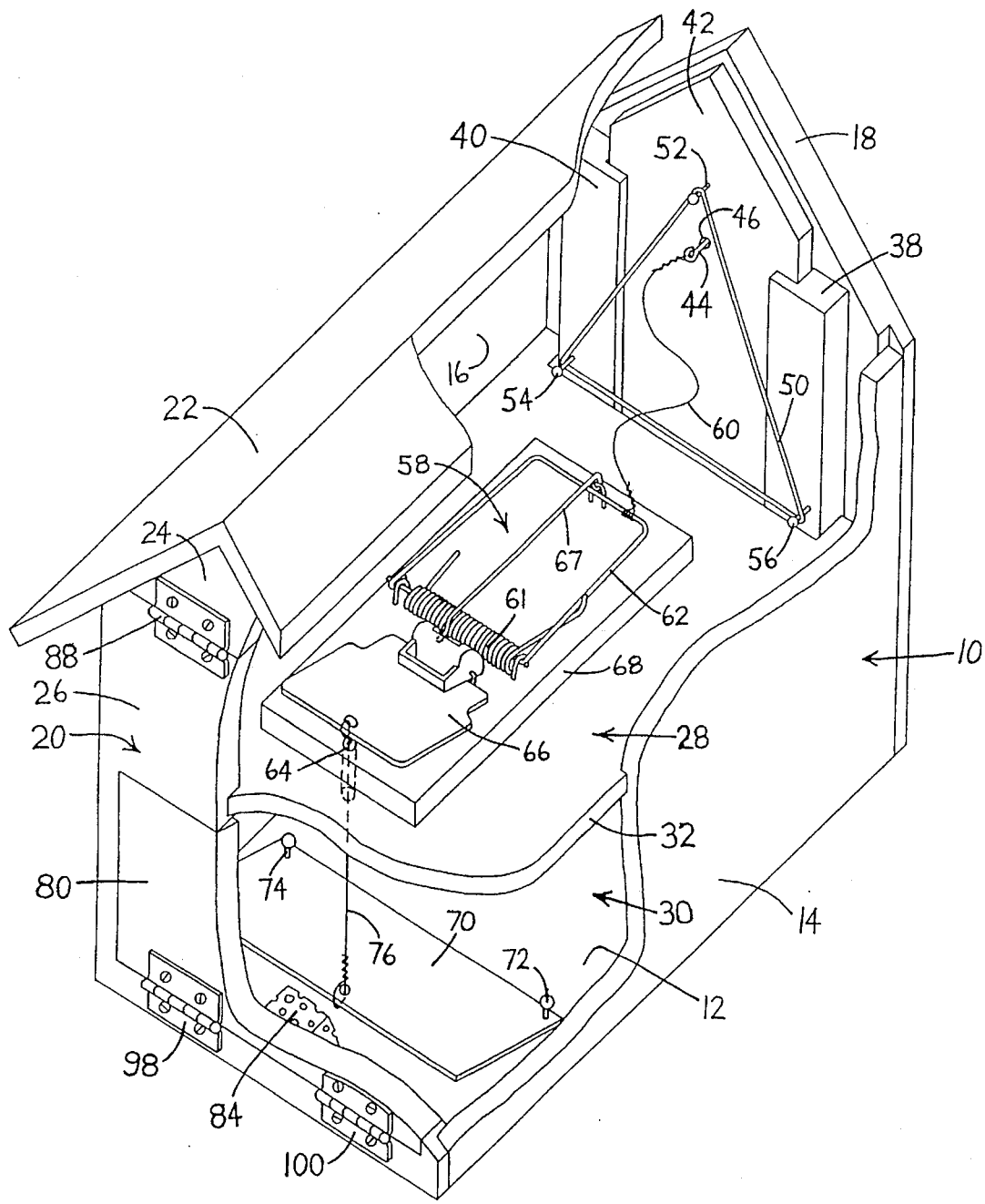
FIG. 1 is a perspective view of the preferred embodiment of the invention with portions of the outer housing cut away to facilitate viewing of internal parts.

The rodent trap 10 of the present invention is best illustrated in FIG. 1 which is a perspective view of the preferred embodiment of the invention with portions of the outer housing cut away to facilitate viewing of internal parts. The outer housing of rodent trap 10 is comprised of a bottom 12, two opposing side walls 14 and 16, a front wall 18, a rear wall 20, and a roof or top 22. Rear wall 20 is comprised of an upper section 24 and a lower section 26. Rear wall upper section 24 is rotatably attached to rear wall lower section 26 by hinges 88 and 90 as illustrated in FIG. 3. Front wall 18, side walls 14 and 16, rear wall lower section 26, and bottom 12 are connected together to form a box-like structure. Top 22 is attached to rear wall upper section 24.

Internally, rodent trap 10 is divided into an upper compartment 28 and a lower compartment 30 by a horizontal partition 32. Partition 32 is attached to rear wall lower section 26 and side walls 14 and 16, thus defining and separating upper compartment 28 from lower compartment 30.

In order to provide user access to upper compartment 28, means are provided to remove top 22 to expose parts located in upper compartment 28. In its preferred embodiment, I have chosen to use hinges 88 and 90 for means to remove top 22. Hinges 88 and 90 permit pivotal movement of top 22 and rear wall upper section 24 between two positions: open and closed. In the closed position, top 22 simply rests on the upper edge of front wall 18 thereby covering and enclosing all internal parts of upper compartment 28. Top 22 is releasably held in the closed position by latch 34. In the open position, as shown in FIG. 7, top 22 and rear wall upper section 24 are rotated upward and away from upper compartment 28 thereby uncovering and exposing the internal parts of upper compartment 28.

Figures 5A, 5B:
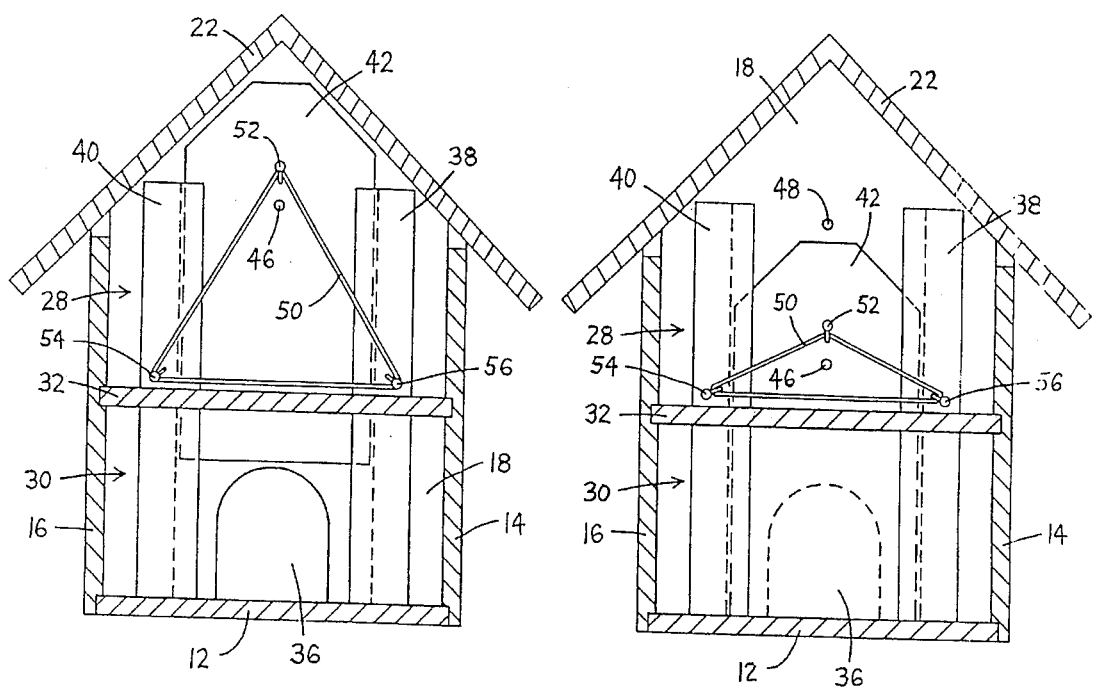
FIG. 5A is a cross-sectional view taken in the plane indicated by line 5—5 of FIG. 4, illustrating the front wall of the rodent trap, as seen from inside the upper and lower compartments, and showing the trap door in its upper or open position.
FIG. 5B is the same view as FIG. 5A, except
Figure 6:
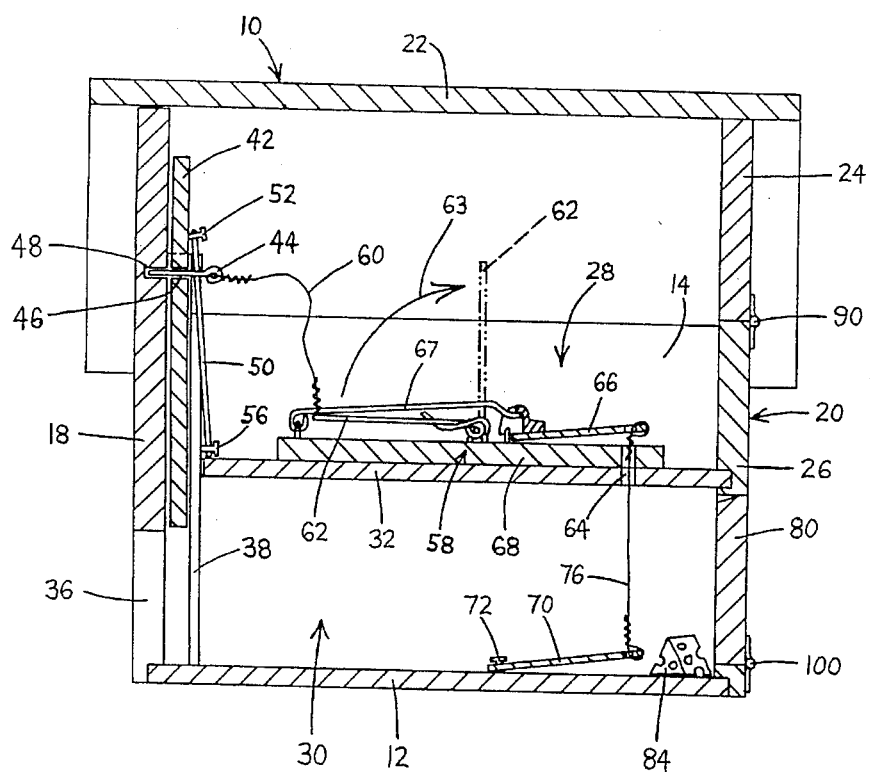
FIG. 6 is a cross-sectional view taken in the plane indicated by line 6—6 of FIG. 4, illustrating the position of all moving parts when the rodent trap is set for rodent trapping purposes, and illustrating an intermediate position of the mechanical intensifier after the rodent trap has been triggered.

A rodent-sized inlet opening 36 is provided in front wall 18 which allows a rodent to enter lower compartment 30. Guide means are provided to guide a vertically slidable trap door 42 between upper and lower positions. In its preferred embodiment, I have chosen to use two opposing vertical side channels 38 and 40 to guide trap door 42 between upper and lower positions. Side channels 38 and 40 are mounted to the inner surface of front wall 18. Trap door 42 is vertically slidable within side channels 38 and 40 such that inlet opening 36 is closed when trap door 42 is in the lower position as shown in FIG. 5B. When trap door 42 is in the upper position as shown in FIGS. 1, 5A, and 6, inlet opening 36 is open, thus enabling a rodent to enter lower compartment 30 through inlet opening 36.

Trap door 42 has release means provided by a pin 44 for releasably holding trap door 42 in the upper or open position. As shown in FIG. 6, pin 44 occupies a hole 46 in trap door 42 and engages a recess 48 in front wall 18. Thus, when hole 46 and recess 48 are engaged by pin 44, trap door 42 is held in the upper position. Pin 44 is slidable within hole 46 and recess 48 such that pin 44 can be pulled or disengaged from hole 46 and recess 48, thereby releasing trap door 42. Tensioning means are provided for urging trap door 42 toward the lower or closed position. In its preferred embodiment, I have chosen to use a rubber band 50 as tensioning means. Rubber band 50 stretches around nails 52, 54, and 56 as illustrated in FIGS. 1, 5A, and 5B.

A mechanical intensifier 58 is mounted onto the upper surface of partition 32. In its preferred embodiment, mechanical intensifier 58 is a conventional spring-striker mousetrap. Mechanical intensifier 58 is comprised of a stored energy device 61, a kinetic member 62, a trip mechanism 66, a release member 67, and a base 68. Since a conventional mousetrap is the preferred embodiment of mechanical intensifier 58, stored energy device 61 is a conventional mousetrap torsion spring, kinetic member 62 is a conventional mousetrap striker wire, trip mechanism 66 is a conventional mousetrap bait lever, release member 67 is a conventional mousetrap release bar, and base 68 is a conventional mousetrap wooden base. Kinetic member 62 has two static positions: a first or set position in which kinetic member 62 is proximate front wall be as illustrated in FIG. 1, and a second or released position in which kinetic member 62 is proximate rear wall 20. Stored energy device 61 normally urges kinetic member 62 in the direction of arrow 63 as shown in FIG. 6. Release member 67 engages trip mechanism 66 to releasably hold kinetic member 62 in the first position. A flexible upper linkage 60 is attached to kinetic member 62. The opposite end of linkage 60 is attached to pin 44. The preferred length of linkage 60 is such that linkage 60 becomes taut and pulls pin 44 when kinetic member 62 is in a dynamic medial position between the first position and the second position. The dynamic medial position of kinetic member 62 is illustrated with phantom lines in FIG. 6.

A hole 64 is located beneath trip mechanism 66. Hole 64 passes through base 68 and through partition 32 as illustrated in FIG. 6. A treadle-like trigger mechanism 70 is located near rear wall 20 in lower compartment 30. Trigger mechanism 70 is rotatably attached to bottom 12 by tacks 72 and 74. Tacks 72 and 74 hold trigger mechanism 70 in a fixed lateral position while allowing the rear edge of trigger mechanism 70 to rotate off bottom 12 around pivot points created by tacks 72 and 74. A trigger linkage 76 is attached to the rear edge of trigger mechanism 70. The opposite end of trigger linkage 76 is attached to trip mechanism 66. Trigger mechanism 70 is positioned such that trigger linkage 76 extends upward from trigger mechanism 70, through hole 64, and into upper compartment 28 where it is attached to trip mechanism 66. Thus, trigger linkage 76 is a connecting linkage between trigger mechanism 70 and trip mechanism 66. The preferred length of trigger linkage 76 is such that when mechanical intensifier 58 is set, as shown in FIGS. 1 and 6, the rear edge of trigger mechanism 70 is slightly rotated off bottom 12 as shown in FIG. 6, and held in this raised position by trigger linkage 76 which is being supported by trip mechanism 66.

An access opening 78 is provided in rear wall lower section 26. Means are provided to open and close access opening 78. In its preferred embodiment, I have chosen to use an access door 80 which is rotatably mounted to rear wall lower section 26 by hinges 98 and 100 as shown in FIG. 3. Hinges 98 and 100 permit pivotal movement of door 80 between a closed position in which door 80 is vertical, thereby closing access opening 78, and a open position, shown in FIG. 7, in which door 80 is in a generally horizontal position which leaves access opening 78 open. Door 80 is releasably held in the closed position by latch 82. Door 80 serves as an access door which allows the user to place a rodent bait 84 at the rear end of lower compartment 30.

OPERATION OF THE PREFERRED EMBODIMENT

The complete operation of rodent trap 10 consists of three primary steps: (1) setting and baiting, (2) trigger and entrapment, and (3) release of captured rodent.

In order to set rodent trap 10, the user gains access to parts located in upper compartment 28 by rotating top 22 and rear wall upper section 24 to the open position illustrated in FIG. 7, thereby exposing all parts in upper compartment 28. Having access to upper compartment 28, the user then sets mechanical intensifier 58 by moving kinetic member 62 to the first position and securing kinetic member 62 in the first position by engaging release bar 67 with trip mechanism 66. The user then slides trap door 42 vertically upward until hole 46 aligns with recess 48. Pin 44 is then inserted into hole 46 such that pin 44 simultaneously engages hole 46 and recess 48, thereby holding trap door 42 in its upper position. Top 22 is then rotated back to its closed position and secured by latch 34. In its closed position, top 22 prevents small children and pets from touching parts located in upper compartment 28. This makes rodent trap 10 safe for operation in and around households and also prevents accidental triggering.

The user baits rodent trap 10 by rotating door 80 to the open position illustrated in FIG. 7, and placing rodent bait 84 on bottom 12. Bait 84 is placed between rear wall 20 and trigger mechanism 70. Door 80 is then closed and secured by latch 82. After completing this simple setting and baiting process, rodent trap 10 will appear as shown in FIG. 1. Rodent trap 10 is then placed anywhere rodents are suspected to be.

A rodent enters lower compartment 30 by passing through inlet opening 36. Bait 84 is positioned such that the rodent must touch trigger mechanism 70 in order to reach bait 84. When the rodent steps on trigger mechanism 70, trip mechanism 66 is pulled downward by trigger linkage 76, thus causing release member 67 to disengage from trip mechanism 66. When release member 67 disengages from trip mechanism 66, release member 67 releases kinetic member 62 to move under the influence of stored energy device 61. Stored energy device 61 urges kinetic member 62 in the direction of arrow 63, thereby causing kinetic member 62 to rotate rapidly from its first position, shown in FIG. 1, to its second position in which kinetic member 62 is adjacent rear wall 20 and resting on base 68. As kinetic member 62 moves between its first and second positions, and when kinetic member 62 reaches approximately a medial position as shown with phantom lines in FIG. 6, upper linkage 60 becomes taut. As kinetic member 62 moves past the medial position, linkage 60 pulls pin 44 from hole 46 and recess 48, thereby releasing trap door 42. Trap door 42 is urged toward its lower or closed position by rubber band 50. Thus, when pin 44 is pulled from hole 46 and recess 48, trap door 42 slides rapidly downward to its lower position, thereby closing inlet opening 36 and entrapping the live rodent in lower compartment 30.

In order to release the live rodent, the user first takes rodent trap 10 to a desirable location for rodent release. The rodent is released by first rotating top 22 to the open position illustrated in FIG. 7. The user then reaches into upper compartment 28 and disengages rubber band 50 from nail 52. Then using nail 52 as a lifting handle, the user simply slides trap door 42 vertically upward until inlet opening 36 is no longer blocked by trap door 42. The rodent, seeing inlet opening 36 is no longer blocked, exits lower compartment 30 through inlet opening 36.

SUMMARY, RAMIFICATIONS, AND SCOPE

Thus the reader will see that the rodent trap of this invention provides a highly reliable trap with the advantages of being simple in design, easy and inexpensive to manufacture, easy to operate, and safe to the user and all occupants of a household environment, including mice. In addition, the trap is safeguarded against accidental triggering incidents by enclosing all moving parts within the outer housing. A horizontal partition isolates the rodent in a lower compartment which enables the user to manipulate parts in the upper compartment without fear of contacting the captured rodent. Further, to ensure release of the trap door, a mechanical intensifier takes the weak impetus provided by a rodent and intensifies it into a larger force which is used to release the trap door. Still further, the highly sensitive trip mechanism, and the relative positioning of bait, trigger mechanism, and inlet opening ensure the capture of any rodent that chooses to approach the bait.

While my above description contains many specifities, these should not be construed as limitations on the scope of the invention, but rather as an exemplification of one preferred embodiment thereof. Other variations are possible. For example, the outer housing is house shaped simply for visual appeal. Any other shape would suffice, provided all internal moving parts are enclosed within the outer housing. The scale of the invention can also be altered to accommodate larger animals. The outer housing can be constructed of any material that is durable enough to withstand rodent chewing. Materials such as hardwood, metal, plastic, or wire mesh would be suitable. Transparent plastic or wire mesh would allow the user to visually verify a captured rodent. Wire is the preferred linkage material because of its light weight, durability, and flexibility. Similar materials such as cable, cord, or elongate rigid materials can be used, provided they are resistant to rodent chewing. Although the preferred embodiment envisions using as tensioning means a single rubber band stretched around three nails as shown in FIG. 1, other variations would suffice. For example, any type of tensioning device, such as a spring, would be suitable. It is also possible to use more than one tensioning device, such as two springs generally aligned with the vertical side channels. The tensioning device can also be eliminated, which would allow the trap door to simply fall under the force of gravity. A rubber band is preferred for being inexpensive, reliable, and readily available for replacement. The preferred embodiment utilizes two opposing side channels to guide the vertically slidable trap door. Other guide means, such as a vertical channel within the front wall, would be suitable. In its preferred embodiment, I have chosen to use a conventional spring-striker mousetrap as means to mechanically intensify the trigger impetus provided by a rodent. Any other device that can take the relatively weak input force provided by a rodent, and produce an output force of greater magnitude would also work.

Accordingly, the scope of the invention should be determined not by the embodiment illustrated, but by the appended claims and their legal equivalents.

I claim:

1. A humane rodent trap, comprising:
   (a) a outer housing comprised of a front wall, a rear wall, 24, 26 a pair of side walls, a bottom, and a top;
   (b) a partition having an upper and a lower surface, horizontally disposed in said outer housing, whereby said partition internally divides said rodent trap into a upper compartment and a lower compartment;
   (c) means for opening said top to a open-position and closing said top to a closed position;
   (d) an inlet opening in a lower section of said front wall, whereby a rodent may enter said lower compartment of said rodent trap by passing through said inlet opening;
   (e) a trap door which is vertically slidable between an upper and a lower position wherein said inlet opening is closed when said trap door is in said lower position and said inlet opening is open when said door is in said upper position;
   (f) a tensioning means for urging said trap door towards said lower position;
   (g) a mechanical intensifier having a stored energy device, a kinetic member, a trip mechanism, a release member, and a base, disposed on the upper surface of said partition;
   (h) a release means for releasably engaging said trap door in said upper position and for releasing said trap door to move under the influence of said tensioning means when said trip mechanism is operated;
   (i) a upper linkage connecting said release means to said kinetic member;
   (j) a trigger mechanism pivotally disposed in said lower compartment;
   (k) a trigger linkage connecting said trip mechanism to a pivotably movable portion of said trigger mechanism.

2. The rodent trap of claim 1 wherein when said top is in said closed position, all movable parts of said rodent trap are enclosed within said outer housing.

3. The rodent trap of claim 1 wherein when said top is in said open position, all parts within said upper compartment are exposed and easily accessible.

4. The rodent trap of claim 1 further comprising a passage means for said trigger linkage which is comprised of a hole through said partition and through said base of said mechanical intensifier.

5. The rodent trap of claim 1 further comprising a guide means for said trap door which is comprised of a pair of vertical side channels within said outer housing, disposed on said front wall on opposing sides of said inlet opening.

6. The rodent trap of claim 1 wherein said release means is a pin of sufficient length to simultaneously engage a recess in said front wall, extend through a hole in said trap door and have a sufficient portion extending therebeyond for attachment of said upper linkage to said pin.

7. The rodent trap of claim 1 wherein said mechanical intensifier is a conventional spring-striker mousetrap.

8. The rodent trap of claim 1 wherein said stored energy device is a conventional mousetrap torsion spring.

9. The rodent trap of claim 1 wherein said kinetic member is a conventional mousetrap striker wire.

10. The rodent trap of claim 1 wherein said trip mechanism is a conventional mousetrap bait lever.

11. The rodent trap of claim 1 wherein said release member is a conventional mousetrap release bar.

12. The rodent trap of claim 1 wherein said base is a conventional mousetrap wooden base.

13. The rodent trap of claim 1 wherein said tensioning means is a rubber band.

14. The rodent trap of claim 1, further comprising latch means for releasably securing said top in said closed position.

15. The rodent trap of claim 1 wherein said mechanical intensifier takes a weak downward force of a rodent's bodyweight on said trigger mechanism, converts said downward force into a force of greater magnitude, and uses said magnified force to release said trap door.

* * * * *